Figure 1:
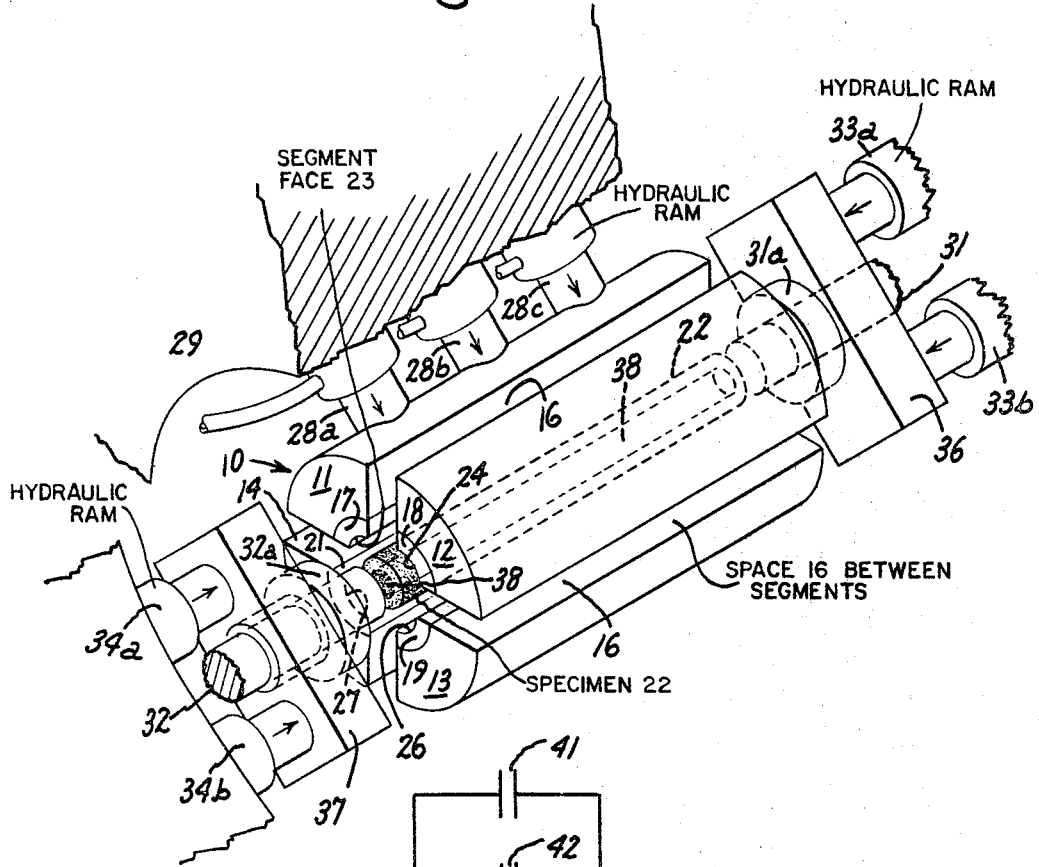

July 25, 1967    F. P. BUNDY    3,332,747
PLURAL WEDGE-SHAPED GRAPHITE MOLD WITH HEATING ELECTRODES
Filed March 24, 1965

Inventor:
Francis P. Bundy,
by *Leo J. Matocci*
His Attorney.

3,332,747
PLURAL WEDGE-SHAPED GRAPHITE MOLD WITH HEATING ELECTRODES

Francis P. Bundy, Scotia, N.Y., assignor to General Electric Company, a corporation of New York
Filed Mar. 24, 1965, Ser. No. 442,266
4 Claims. (Cl. 23—273)

This invention relates to apparatus for the preparation of commercial graphite of improved crystal quality.

The mechanical and electrical properties of graphite, which are of most importance in the practical application of this material, are its chemical purity, the degree of microcrystal perfection and the degree of electrical connection between microcrystals. Commercial graphite of high quality is generally cleansed chemically and then reconstructed crystallographically by recrystallizing the graphite at very high temperatures (in the range from about 2500 to about 3000° C.) in special electric furnaces for rather long periods of time. In some processes boron is added in order to accelerate the recrystallization process.

In experiments conducted on the melting of graphite under high pressures (reported in "Melting of Graphite at Very High Pressure," F. P. Bundy in the Journal of Chemical Physics, vol. 38, No. 3, 618–630, February 1963), it was discovered that by using flash heating the problem of containing liquid carbon could be overcome, because with rapid heating followed by rapid cooling the melting and resolidification of the graphite was limited to the core of the small sample.

Some time after the conduct of the graphite melting experiments it was found that the melted-resolidified graphite had a very high crystal quality, was very lustrous, very slippery and soft, all of which are characteristics of graphite of higher quality than the starting graphite.

From this discovery came the realization that this method of rapid melting-quick cooling of graphite could be used commercially if conducted in an appropriate apparatus for producing high quality graphite specimens of substantial size, i.e., as large as from about 1 to about 2 inches in diameter and from about 1 to about 2 feet in length.

Considerable heating power is required since the power applied must be sufficient to heat the specimen to its melting temperature in a period of time, which is small ($\frac{1}{5}$ or less) compared to the "half-cool-off time" of the graphite specimen in its environment. The "half-cool-off time" is defined as the time required for a specimen to cool to one-half the initial temperature considered as the reference temperature. Thus, the heating power must be applied to heat the specimen in a period of time which is $\frac{1}{5}$ or less the time required for the graphite specimen to cool from $T_{hot}$ to $\frac{1}{2} T_{hot}$. Fortunately, any of the variety of graphites, i.e., Acheson, spectrographic, pyrolytic, natural graphite, may be employed as the "raw" graphite and be converted to higher quality crystalline graphite by the melting-cooling method. The "raw," or starting, graphite will have a density in the range of from about 1.4 to about 1.7 g./cm.$^3$ and an electrical resistivity of about 1000 microohm centimeter. The end product, the high quality crystalline graphite, will have a density of greater than 2.1 g./cm.$^3$ and an electrical resistivity of about 200 microohm centimeter.

From the aforementioned electrical values it may be seen that it would be particularly advantageous to convert a rod of graphite into high quality crystalline graphite, because this would allow direct mechanical cutting of the rod into individual small blocks to be used as motor brushes, wherein high electrical conductivity is required.

In the design of apparatus for the commercial upgrading of ordinary graphite to high quality crystalline graphite, it was necessary to consider a number of factors. The apparatus would have to provide for the application of pressure to the "raw" graphite in order to conduct the melting and recrystallization thereof above the triple point pressure (the point at which solid graphite, liquid graphite and graphite vapor could exist), a pressure value of about 0.10 kilobars. To be practical, a relatively large volume would have to be accommodated by the device. Because of the large heat input required the portions of the apparatus in contact with the graphite specimen would have to be refractory in nature, yet insure rapid heat transfer from the graphite specimen to the apparatus in order to quickly cool that graphite, which has been melted. A preferred form for the graphite specimen would be that its shape shall be such as to enable matching of the impedance of the sample (specimen) to the impedance of the energy source. Thus, the specimen should be long in proportion to its cross-sectional dimensions. Further, in order to accomplish the requisite heat energy input it would be necessary to provide facilities for the easy application of electric current (or other suitable mode of energy input) to the graphite sample.

It is therefore an object of this invention to provide an apparatus for the commercial preparation of high quality crystalline graphite.

It is another object of this invention to provide a pressure apparatus employing a cylindrical split-mold, which may be rapidly charged with "raw" graphite rods and from which these rods may be simply and quickly removed, after conversion of a portion thereof to high quality crystalline graphite.

These and other objects are achieved by the use in combination of a cylindrical split-mold type pressure chamber in which the wall segments may be moved radially inwardly to apply pressure to the contained cylindrical "raw" graphite specimen, and means for applying very quickly a high energy input from an energy storage source to provide flash heating of the "raw" specimen in the axial direction. The inner portions of the mold segments comprise a layer of strong inert refractory material, such as alumina, while the massive remainders of the mold segments are of hardened steel, or similar material, and function as a heat sink. The mold segments are in turn backed by hydraulic rams for the controlled application of pressure to the centrally-located longitudinally extending "raw" graphite specimen. The mold may be closed to a diameter, which would be sufficiently smaller than the diameter of the raw graphite specimen that the available free compression stroke will bring the specimen at least to the pressure necessary for the conversion. Excess graphite would tend to be extruded into the narrow gaps between the individual segments of the mold during the compression stroke, thereby automatically providing gasketing to contain the pressure application.

Figure 2:
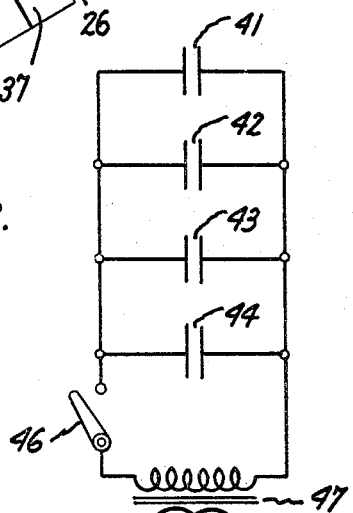

The exact nature of this invention as well as other objects and advantages thereof will be readily apparent from consideration of the following specification relating to the annexed drawing in which:

FIG. 1 is a schematic representation of a preferred embodiment of the apparatus of this invention, and FIG. 2 illustrates the heating circuit comprising the heating energy storage system employed for the flash heating.

Pressure multiplying apparatus 10 is composed of the wedge-shaped segments 11, 12, 13, 14, the degree of pressure multiplication of which is dependent on the relative areas of their outer and inner surfaces. Although four such segments have been shown by way of example, this is not intended to be a limiting aspect of this invention, since other numbers of segments may be used. A narrow gap 16 exists between the adjacent faces of the segments prior to the application of pressure. The inner portions 17, 18, 19 and 21 of segments 11, 12, 13 and 14, respectively, are placed in contact with the outer surface of graphite specimen 22, which is to be converted to high quality crystalline graphite. Preferably, the "raw" graphite specimen 22 is provided in a cylindrical longitudinally-extending shape, although other shapes may be employed in which cases the faces 23, 24, 26, 27 of portions 17, 18, 19 and 21, respectively, would be formed in the appropriate configuration. In the case of the arrangement shown, the outer diameter of specimen 22 is somewhat greater than the diameter of the space of substantially circular cross-section defined by faces 23, 24, 26, 27, when segments 11, 12, 13 and 14 are pressed together with adjacent faces of the segments in contact with each other.

Each of the wedge-shaped segments 11-14 is relatively massive and made conveniently in two parts, as shown, with the larger portion being of hard steel, tungsten carbide or similar material, which is strong and also able to function effectively as a heat sink. The ceramic liner inner portion is of some strong, inert refractory material such as alumina or magnesia, for example. Hydraulic rams (only three of which 28a, 28b and 28c are shown) are urged against the outer surfaces of segments 11-14. A large outer binding ring 29, a portion of which is shown, provides a reacting buttress enclosing the pressure exerting components. Electrodes 31, 32 preferably of copper, in direct contact with the opposite ends of specimen 22 are also forced toward each other to aid in the application of pressure to the specimen 22. One manner in which electrodes 31, 32 can be forced toward each other simultaneously with the movement of elements 11-14 is shown in FIG. 1. Shoulders 31a, 32a are formed on electrodes 31 and 32 to enable the transmission of force to the electrodes from rams 33a, 33b and 34a, 34b via blocks 36, 37 which abut, but are electrically insulated from, shoulders 31a, 32a. The abutments for rams 33a, 33b, 34a, 34b may either be connected to binding ring 29 or be independently supported.

Simultaneously with the application of pressure to specimen 22 a very large concentration of electrical energy is passed through specimen 22 via electrodes 31, 32 in a very short period of time to provide the necessary heating energy to melt the "raw" graphite. The energy requirement for this melting is about 80 kcal./mole of graphite, or 25 million joules per kilogram. Thus, for a rod of "raw" graphite measuring as much as 2 inches in diameter this large amount of heating energy would have to be delivered in less than a second.

Fortunately, the resistance-temperature characteristics of "raw" graphite are such that the heating current (and therefore the heating itself) tends to be concentrated in the center of the rod 22 through the length thereof. As a result the refractory liners 17-21 remain undamaged, because they are not subjected to being melted or vaporized by "runaway" electrical heating.

The heating energy storage system could be any of several arrangements, such as a system employing electrical capacitors in combination with a coupling transformers, or a large electrical inductor in which the energy would be stored in a magnetic field or a mechanical flywheel-generator combination.

By supplying the above-noted energy requirements for the melting of the graphite, about one-half of the total amount of graphite specimen 22 is converted to the high quality form, this converted material comprising the central core of the specimen covered by an outer layer of unconverted "raw" graphite. After conduct of the conversion has been accomplished the outer unmelted part of the specimen is stripped away leaving inner core 38 of high quality graphite to be directly machined as desired for such uses as carbon brushes, moderator rods for nuclear reactors, startng material of increased density for the manufacture of diamonds, etc.

When such a device is given constant use, as during commercial production, heat may be constantly dissipated to the mass of elements 11-14 at such a rate that a buildup will occur. In order to prevent consequent overheating of these elements it may be advantageous to circulate cooling water through passages near the outer perimeter of elements 11-14 to enable substantially constant production.

In FIG. 2 is shown a schematic representation of a system for applying heating energy to specimen 22 by the use of electrical energy, the bank of capacitors 41, 42, 43, 44 connected in parallel and connected by a switch 46 to step-down transformer 47. The other side of transformer 47 is connected across specimen 22, by means of electrodes 31, 32.

It should be understood, of course, that the foregoing disclosure relates to only a preferred embodiment of the invention and that numerous modifications or alterations may be made therein without departing from the spirit and scope of the invention as set forth in the appended claims.

What I claim as new and desire to secure by Letters Patent of the United States is:

1. In an apparatus for converting graphite to a higher quality form having greatly improved electrical conductance comprising in combination:
 (a) a plurality of separate contiguous longitudinally extending segments of wedge-shaped transverse cross-section,
  (1) said segments cooperating to move radially inward into contact with each other to effectively define a cylindrical space, which cylindrical space is long in proportion to the cross-sectional dimension thereof,
  (2) said segments each comprising two parts, a relatively thick, massive outer part of strong material having good heat conducting properties and a relatively thin inner part of heat conducting refractory material, each of said inner parts lining a portion of said cylindrical space,
 (b) means for simultaneously urging each of said separate segments radially inwardly, and
 (c) opposing electrode means having portions thereof substantially axially aligned with the central axis of said cylindrical space movable inwardly along the axis for simultaneously applying pressure axially of said cylindrical space and for introducing heating energy to the contents thereof.

2. The apparatus for converting graphite substantially as recited in claim 1 wherein the liner portions are of alumina.

3. The apparatus for converting graphite substantially as recited in claim 1 wherein the means for simultaneously applying pressure and introducing heat energy includes a capacitor storage system electrically connected thereto.

4. The apparatus for converting graphite substantially as recited in claim 1 wherein the cylindrical space enclosed is in the shape of a right circular cylinder and the ratio of diameter-to-length is in the range of from about 1/12 to about 1/24.

References Cited

UNITED STATES PATENTS

| | | | |
|---|---|---|---|
| 2,544,414 | 3/1951 | Bridgman et al. | 23—209.1 |
| 2,797,437 | 7/1957 | Tejyynen | 18—16 |
| 2,999,271 | 9/1961 | Falk | 18—16.5 |
| 3,031,269 | 4/1962 | Bovenkerk | 23—252 |
| 3,134,139 | 5/1964 | Wentorf | 18—16 |
| 3,150,413 | 9/1964 | Zeitlin | 23—209.1 |
| 3,213,491 | 10/1965 | Crain | 18—16.5 |
| 3,241,188 | 3/1966 | Febbo | 18—16.5 |

NORMAN YUDKOFF, *Primary Examiner.*

G. P. HINES, *Assistant Examiner.*